March 23, 1943.  S. S. GREEN  2,314,447
OVERLOAD COMPENSATION FOR WATT-HOUR METERS
Filed June 10, 1939   2 Sheets-Sheet 2

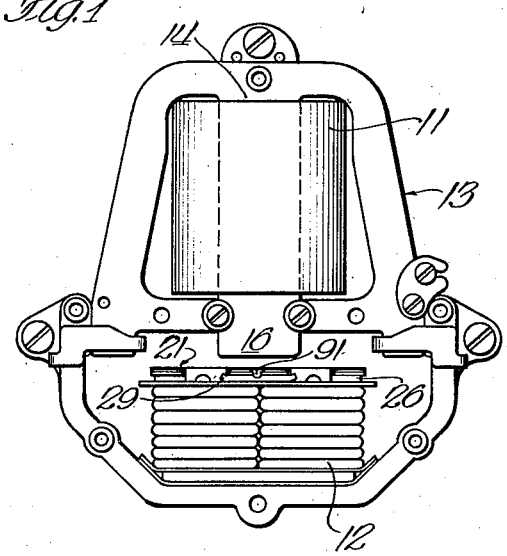
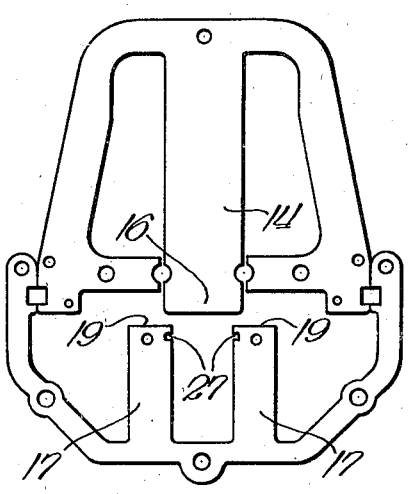
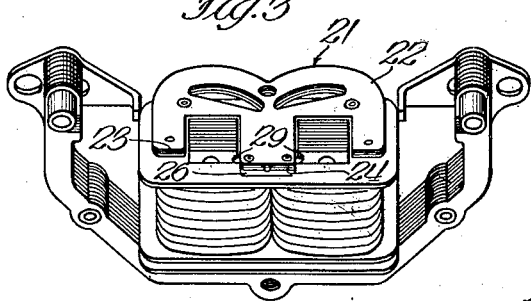
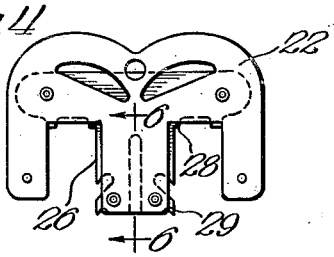
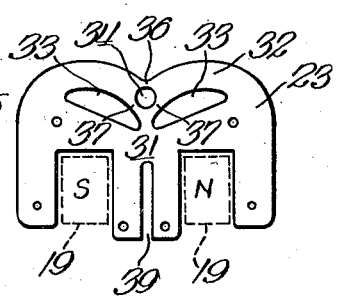
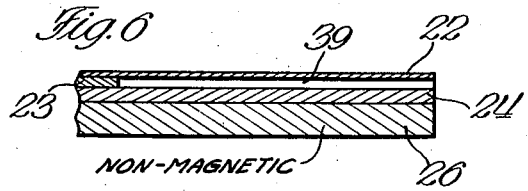
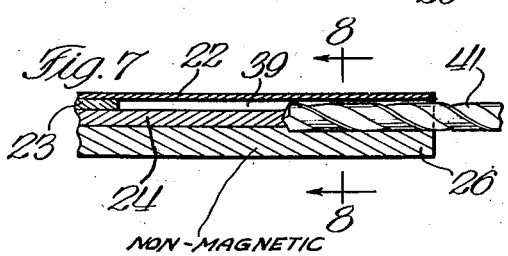
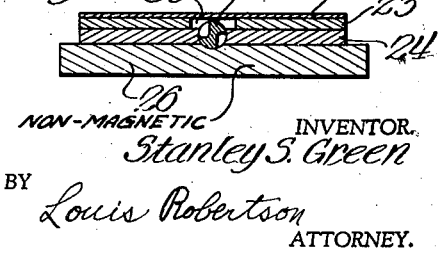

INVENTOR.
Stanley S. Green
BY Louis Robertson
ATTORNEY.

Patented Mar. 23, 1943

2,314,447

UNITED STATES PATENT OFFICE 2,314,447

OVERLOAD COMPENSATION FOR WATT-HOUR METERS

Stanley S. Green, La Fayette, Ind., assignor to Duncan Electric Manufacturing Company, La Fayette, Ind., a corporation of Illinois Application June 10, 1939, Serial No. 278,510

8 Claims. (Cl. 171—264)

This application relates to watt-hour meters, which are more generally known by consumers of electricity as electric meters. It relates particularly to overload compensators for such meters which make the meters more accurate. Without such compensators, a meter that is adjusted to be accurate at a certain current value will not be accurate at other much higher current values.

It has been common for many years to compensate meters to make them accurate for the higher currents or overloads as well as the lower or more common loads. The compensators have not been of an adjustable nature, however, and the practice has been to design them for the average requirements. In my copending application Serial No. 48,713, filed November 7, 1935, now Patent No. 2,167,649, I disclose a compensating plate which is slipped onto the poles of the current magnet of a meter and which compensates very accurately on the average for loads which meters were then designed to carry. The present invention utilizes the principles of the invention there disclosed and incorporates some improvements therein and provides a new method of manufacture including calibration and adjustment which results in greater consistency of accuracy than was heretofore possible. The improvements in the overload plate are chiefly to adapt it to be more accurate for higher overloads than those for which it was previously designed, and to adapt it for carrying out the new method of manufacture, calibration and adjustment.

The necessity for the new method arises from the fact that meters manufactured in the same plant with the intention of making them as much alike as possible are not really identical. The greatest variations are caused by variations in the metal used for the laminated cores of the magnets. The metal varies slightly in thickness, and the magnetic qualities of two different batches will not be identical, with the result that, except for adjustments, the accuracy of the meters cannot be the same. There has been a universal practice of making certain calibrations and adjustments of each meter separately. Such common individual calibrations or adjustments do not adjust the amount of overload compensation, and therefore, although the meter may be calibrated for accuracy at normal 100% load, its minute variations from average may be such that it needs more than an average amount of compensation at 300% or 400% load, with the result that with a compensator designed to meet the average needs the meter will not be as accurate as desired under 300% or 400% overload. Furthermore, the characteristics of the metal in the overload plate varies, with the result that plates made from one batch of metal may give a different amount of compensation than plates made identically from a different batch of metal.

According to the present invention it is practical to test the meters together with their overload plates as often as may be desired and in effect adjust the overload plates so that the overload compensation may always be within the desired limits, with the result that the meter when calibrated or adjusted for accuracy at 100% load will automatically be sufficiently accurate at 400% load. Thus, it is now practical each day or each time a new run of material is used either in the laminations or in the overload plate to test a fair sample of the meters, determine the compensation needed for the particular run of meters, and adjust the overload plates in manufacture accurately to this need. In fact, the method of testing and adjusting the overload plates is so simple and quick that it is even practical to adjust each overload plate to the compensation needed by the particular meter.

Additional advantages and objects of the invention will be apparent from the following description and from the drawings, in which:

Fig. 1 is a face view of a driving element for a watt-hour meter embodying this invention.

Fig. 2 is a similar view showing the core laminations.

Fig. 3 is a perspective view of the current magnet forming the lower portion of Fig. 1.

Fig. 4 is a plan view of the overload plate shown in Fig. 3.

Fig. 5 is a plan view of the next to the top lamination of the overload plate shown in Fig. 3.

Fig. 6 is a sectional view taken on the line 6—6 of Fig. 4.

Fig. 7 is a corresponding view showing the drilling of the overload plate for calibration thereof.

Fig. 8 is a cross sectional view taken on the line 8—8 of Fig. 7.

Figure 9:
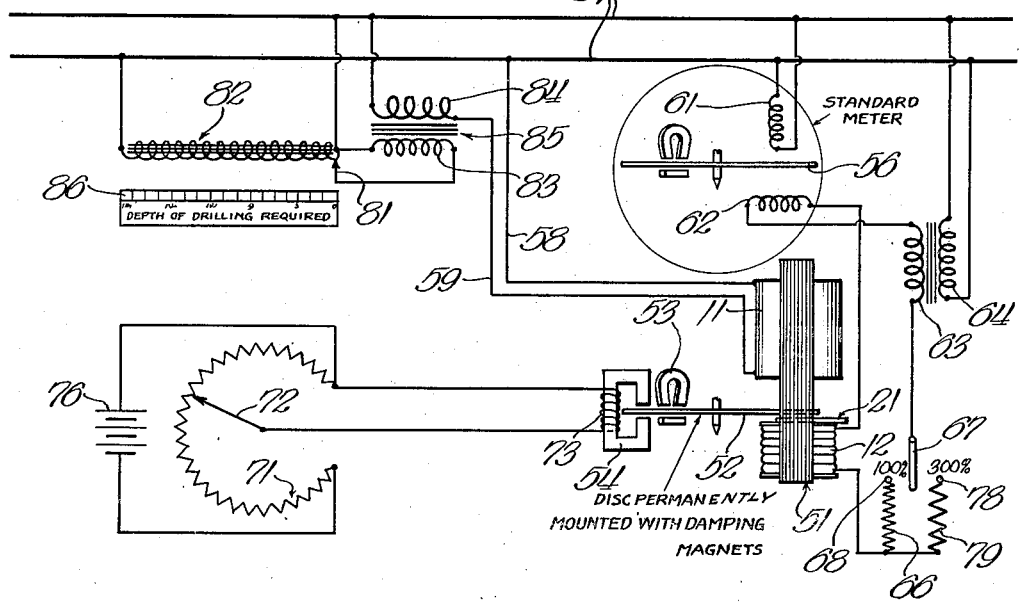
Fig. 9 is a mainly diagrammatic illustration of the method of testing a driving unit such as that shown in Fig. 1.

Although both the overload plate and the method of manufacturing and calibrating it may take various forms, only one form of each has been chosen for illustration. These embodiments of the invention have been shown in the drawings and will hereinafter be described all as required by section 4888 of the Revised Statutes, but the invention may take numerous forms and the appended claims are not to be limited by the disclosure except as required by the prior art.

The invention has been illustrated in conjunction with a driving unit now on the market. This driving unit includes a potential or voltage coil 11 and a current coil 12 carried by a suitable stack of laminations, indicated as a whole by 13. Although the stack of laminations is made up in two separable parts, as shown in Fig. 2, the details thereof need not be considered for the most part. The voltage coil 11 is positioned on a core 14 which terminates in a voltage pole 16. The current coil 12 is carried on a pair of core portions 17 which terminate in current poles 19. The space between the pole 16 and the poles 19 is the gap through which the meter disc rotates. The magnetism generated by the coil 11 is called the voltage flux and passes through the disc from the pole 16 to the poles 19, while the current flux passes through the disc twice, from one pole 19 to the pole 16 and back to the other pole 19. As each of these magnetic fluxes alternate due to the alternating current in the coils, each induces a current within the disc called an eddy current. The eddy current induced by one magnet reacts with the magnetism of the other magnet to drive the disc, just as a motor is driven. The disc is retarded by one or more permanent magnets positioned adjacent the disc so that, insofar as we have stated the theory to this point, the speed of the disc would be proportional to the watts, i. e., to the product of the volts multiplied by the amperes. In other words, to the extent of the explanation to this point, the speed of the disc would be proportional to the amount of current, assuming for the purpose of simplifying the present discussion that the voltage is constant. This ideal proportionality, however, is not reached this simply because of another effect of the magnetism emanating from the current coils. This effect is similar to the effect of the permanent magnet in retarding the disc. If the retarding effect and the driving effect of the current magnetism both increased at the same rate as the current increased, the speed of the disc would still be proportional to the current, but such is not the case. The retarding effect increases disproportionately, with the result that, as the current increases, it is necessary to provide some compensation for the disproportionate increase of its retarding effect in order to keep the meter accurate at the higher current values. This compensation is commonly called overload compensation even though the compensation comes into play before the meter is truly overloaded. In other words, for the purpose of this application, an overload will be taken as meaning a current above the value for which the meter is nominally rated (for historical reasons) rather than above the value which it is in fact designed to carry continuously.

The current to be measured by a meter may fluctuate from zero to many amperes. It is customary to calibrate and adjust a meter at nominal full load, i. e., at the amperage which for historical reasons is considered its normal load. Modern meters, however, are designed to carry 300% or 400% load, which means an amperage of three or four times the value of its nominal full load amperage. These high loads are commonly called overloads, even though the meter may be designed to carry them continuously, so that the current value called 400% load may be in fact only full load.

The compensation for these high current values is supplied by the compensating plate 21 which is slipped onto the poles 19, its final position being seen best in Fig. 3. This compensating plate preferably comprises a plurality of laminations 22, 23 and 24 which are riveted to and carried by a brass plate 26. The brass plate 26 slides into notches 27 in the poles 19. For the sake of accurately and permanently positioning the laminations at the desired spacing from the poles 19, the brass plate 26 is provided with shoulders 28 which abut against the faces of the poles 19, and lugs 29 which are peened over against the opposite faces of the poles 19. Being spaced from the poles, the laminations receive leakage flux from the poles, the amount of flux received depending upon the current value in the current coils 12.

The manner in which the compensating plate 21 compensates can best be described by reference to Fig. 5 and with the assumption that all three laminations were similar to the lamination 23 there shown. In this figure the poles 19 have been shown in dotted lines and marked with "N" and "S" to indicate that one is a north pole and the other a south pole during a given half cycle of the alternating current. With low current values, a relatively small amount of flux enters the lamination 23, and nearly all of this flux may pass with relative ease from the south to the north pole through the central web 31 which may be considered the short path for flux. As the current increases and the amount of flux in the lamination 23 increases, it becomes increasingly difficult for this flux to traverse the short path or web 31 because the web 31 approaches the knee on the permeability curve, commonly spoken of as approaching saturation, and therefore a larger and larger proportion of magnetic flux must seek other paths. One of these other paths is the path through the disc, and the larger and larger proportion of magnetism from the overload plate 21, which must pass through the disc as the current increases, provides the compensation for the disproportional increase of retarding effect of the current magnetism.

If there were no path within the lamination 23 other than the path 31, the compensating effect would be too abrupt because of the relative abruptness with which the web 31 approaches saturation. A long path 32 is therefore provided, being separated from the short path by the slots 33. Because of the length of this path 32, the magnetic flux from the south pole cannot traverse it to the north pole as readily as the short path 31. However, as the short path 31 approaches saturation, more and more flux will pass through the long path 32 and thus be diverted from the useful path through the disc. The combination of the two paths of different lengths gives a very smooth and uniform increase in the proportion of magnetic flux which is expelled from the plate 21 and thus made available for driving the disc and hence for compensation. It has been found that providing a hole 34 at the position shown in Fig. 5 has a beneficial effect, at least when compensation is desired over a wide range. This is believed to be in part because of somewhat increasing the reluctance of the long path 32 or in avoiding a zone of low reluctance at the center thereof. It is apparent, however, that it also divides this long path 32 into two paths, one through the web 36 and the other through the webs 37. Since the webs 37 comprise a longer path than the path around the slots 33 and through the web 36 and has considerably greater reluctance, it follows that the flux in path 32 will tend more to choose the web 36 with the result that this web will approach saturation more quickly than the webs 37. In other words, there are three distinct paths of successively greater length and reluctance, one through web 31, one through web 36, and the other through webs 37. It seems to be possible with the three distinct paths to save a larger proportion of the compensation available for use at the highest current values where it is most necessary than was possible with only two distinct paths, keeping in mind the necessity for a smooth gradual increase in the compensation. Of course, each distinct path comprises in reality a large number of indistinct paths or courses, and where the main path is curved the courses successively further from the inside of the curves are successively longer. The tortuousness of the long path 32, even aside from the hole 34, is desirable because of increasing the difference in length between the longer and shorter courses within the path.

The smoothing off of the compensation curve is especially important with the present tendency toward meters carrying higher and higher loads. Such meters require more and more compensation. To provide a high amount of compensation available from the present compensator it is positioned flush with the top of the poles 19, as close to the disc as possible without reducing the gap width. The increased compensation available must be spread over a wider range, and the position of slots 33 and the provision of hole 34 both help to this end.

Regardless of the exact nature and effect of path 32, the cross section of the web or path 31 is very important. If this cross section is small, a very small proportion of the flux entering the lamination 23 under heavy load conditions can pass through it idly and therefore the compensation is great. If the cross section of path 31 is large, a larger proportion of flux can pass through it idly and the compensation is smaller. In other words, the cross section of the short path 31 determines to a large extent the proportion of the flux which is caused to pass through the disc at any given current value. It follows that the compensation can be increased by reducing the cross section of the path 31. It is this principle that is utilized in calibrating and adjusting the overload plate.

In U. S. Patent No. 2,167,649, previously mentioned, the overload plate comprised three identical laminations, each including a slot similar to slot 39 in Fig. 5, though not quite so deep. In devising the method of calibration and adjustment here disclosed there were two major problems. One was to provide a quick and efficient test method to determine what cross section for the path 31 was necessary to give the compensation required in a given meter, and the other was to devise a method of changing or adjusting this cross section. The general method of adjustment decided upon was to initially make the compensating plate with the slots 39 shallow, and then drill them deeper to whatever depth the test indicated was necessary. This simple principle did not solve the problem, however, because burrs or other particles of magnetic metal were sometimes found above the surface of the plate 21. These are very objectionable in meter practice because there is danger that they will interfere with the movement of the disc.

It was found that the danger of burrs or particles appearing above the overload plate as the result of the drilling could be avoided by not drilling the top surface of the plate, or, in other words, using a fine drill which ran into the plate from its side in a direction parallel to its surface but positioned entirely below the top surface of the plate. Although this cured the burr difficulty, it introduced another difficulty in that the lateral position of the drill (its closeness to the top surface) could not be controlled with absolute accuracy. The hole drilled by the drill would therefore be a little closer to the surface of the plate one time than another. The thickness of the upper lamination which was left above the drill hole would therefore vary from one time to another and since this was a part of the cross section of the short path, corresponding to the path 31 in Fig. 5, the resulting cross sectional area of this path was not always that which would be expected from the depth of the drilled hole.

This additional difficulty was solved by the expedient shown in Figs. 3 to 8. The top lamination 22 and the bottom lamination or laminations 24 are made without any slot corresponding to the slot 39. Between the two is positioned the lamination 23, which is provided with a deep slot 39, deeper than any drilling that will be necessary. The drilling is then performed as seen in Figs. 7 and 8 by drilling the lower lamination or laminations 24 and permitting the side of the drill to extend into the slot 39 without letting it touch the upper lamination 22. The fact that the drill also drills into the brass plate 26 is without significance since this plate is non-magnetic. Because of the slot 39, minute variations in the lateral positioning of the drill 41 will now have substantially no effect. The thickness of the top lamination 22 is never altered and the slot 39 is never altered. Since the lateral positioning of the drill 41 does not vary enough to keep the drill from projecting beyond both sides of the lamination 24, a clean slot is invariably cut in this lamination to whatever depth the drill 41 is thrust. The resulting cross section of the short path corresponding to the web 31 in Fig. 5 is determined safely and reliably by the depth of drilling. In short, both the brass plate 26 and the air of slot 39 comprise non-magnetic zones into which the sides of the drill extend without any need for uniformity.

*Method of testing*

The solution of the problem of drilling the overload compensating plate to provide a desired cross section for a flux path therein does not entirely solve the problem because there remains the difficulty of determining how deep the drilling should go. Were this depth constant, there would be no necessity for bothering with drilling because the slots could be stamped to a constant depth. Variations in the metal used in the laminations produce variations in the characteristics of the meter so that when a different run of metal is used, either for the overload compensating plate or for the magnet laminations, different compensation or depth of drilling is required. Furthermore, even minute variations of thickness or other variations occurring during the course of manufacture with laminations which are all from the same batch of metal might make some slight variation in compensation desirable. A very quick and practical method of determining the amount of compensation needed in any particular case is illustrated in Fig. 9.

The most practical method of determining the accuracy of a meter is to compare the speed of its disc with the speed of the disc of a standard meter operating under the same load. This comparison is now commonly made by stroboscopic methods. One such method is disclosed in United States Patent No. 1,427,776, issued to O. T. Blathy on September 5, 1932. Another is disclosed in United States Patent No. 1,949,743, issued to Frederick Holmes on March 6, 1934. In short, one method is to illuminate the disc of the meter being tested with flashes of light synchronized with the teeth or other formations on the standard disc. If the two discs are rotating at the same speed, the teeth of the disc being tested will seem to stand still, assuming of course that the two discs are alike. If the disc does not seem to stand still, the meter is adjusted until it does.

It is not commercially practical to completely assemble a meter, make the ordinary calibrations, test it additionally to determine the amount of compensation necessary and then disassemble it to perform the necessary drilling of the overload plate, again reassemble it and recalibrate it. In fact, the difficulty of this procedure has heretofore made any idea of adjustment in the compensation of meters seem ridiculous and out of the question.

According to the present method a driving unit 51 to be tested is slipped over a test disc 52 forming part of a permanent test unit, and tested with respect to that unit while being temporarily secured in proper position with respect thereto. It is then removed for drilling of the overload plate, after which the assembly of the meter is completed according to standard procedure. The disc 52 is permanently mounted on suitable bearings, and damping means including a permanent magnet 53 and a direct current electromagnet 54 are properly associated therewith. The speed of the test disc 52 is compared with the speed of a disc 56 of a standard meter operating with identical load. It is believed that both the method and the appaartus can be explained most simply by describing the procedure.

The unit 51 to be tested need not be complete. In fact, it is preferred that the test be made before the customary light load adjustment plate is applied and before the customary phasing coil is connected and before the unit is dipped in the sealing paint. The compenating plate 21 should be in place, however, and the lugs 29 should be peened over to assure a permanent positioning of the plate 21. The unit is then slipped over the disc 52 where it may be accurately and firmly positioned in any desired manner. When the test connections have been made as illustrated in Fig. 9, it will be seen that the voltage coil 11 is connected across the line wires 57 by means of connecting wires 58 and 59. The potential coil 61 of the standard meter is also connected across the line wires 57 so that the two coils 11 and 61 are subjected to the same voltage. The current coil 12 is connected in series with the current coil 62 of the standard meter so that the same current flows through both coils. This current is preferably that known as the phantom load current, being derived from the secondary coil 63 of a transformer in a well known manner. The primary coil 64 of this transformer is connected across the line wires 57.

Initially, the phantom load circuit includes a resistance 66, being closed by moving switch lever 67 to contact 68. The resistance 66 is of a value chosen to cause approximately the current value for which the unit 51 is nominally rated to flow through the coils 12 and 62. The first test of unit 51 is therefore at 100% load. After the switch 67 has been closed on contact 68, it will usually be observed that the disc 52 is not rotating at quite the same speed as the disc 56. The customary means for adjusting a completed meter to accuracy at 100% load is to make an adjustment with respect to the permanent damping magnet 53. According to the present invention, however, this magnet in the test unit is adjusted so that it is always too weak, and supplemental damping magnetism is supplied by the electromagnet 54 which may be very easily adjusted by means of a potentiometer 71. Accordingly, the contact or knob 72 of the potentiometer is turned until the current value in coil 73 of the electromagnet produces just the right amount of magnetism for retarding the disc 52 to the exact speed of the disc 56. Because of the fact that only very little additional magnetism need be supplied by the electromagnet 54, it is never necessary to have much current flowing through the coil 73. Accordingly, a storage battery 76 is a very suitable source of supply since it will not have any detectable variation of voltage during the course of one test. The resistance of potentiometer 71 does not need to give a very wide range of voltage and hence may be quite delicate so that the disc 52 may be brought to the same speed as the disc 56 quite accurately and almost instantaneously. Once that adjustment is made, the temporary adjustment of unit 51, disc 52, and the damping magnet system including magnets 53 and 54, has in effect become a watt-hour meter which is accurate at 100% load. The potentiometer contact 72 is not changed during the remainder of the test, so this test meter remains accurate as to the 100% load.

The switch lever 67 is now shifted over to the right to contact 78, thus connecting resistance 79 in the phantom load circuit in place of resistance 66. Resistance 79 has a value chosen to provide a load current through coils 12 and 62 which is much higher than the 100% load, say, approximately the 300% load value, or, in other words, three times as great as the current which flowed through the same meter coils when resistance 66 was connected in the circuit. It will now be observed that the disc 52 is again rotating more slowly than the disc 56, showing that the overload compensation is not adequate. It should be explained that the overload plate 21 is designed to take care of extreme conditions so that its compensation will always be initially inadequate. The purpose of the test is to determine how inadequate it is and therefore how deeply it should be drilled to provide adequate compensation. This is accomplished by the very simple and almost instantaneous procedure of sliding a contact 81 along the taps of an auto transformer 82 until the disc 52 is brought up to the speed of the disc 56.

The manner in which contact 81 accomplishes this result is by causing a boost in the voltage applied to the coil 11. A primary coil 83 of a transformer 85 is connected to the auto transformer 82 through the contact 81, and the secondary coil 84 is interposed in the connecting wire 59 so that it boosts the voltage impressed on coil 11. The amount that the voltage is boosted is therefore increased as the contact 81 is slid to the left along the taps of the auto transformer 82. A scale 86 is preferably provided adjacent the path of contact 81 to determine the amount of its movement and therefore the amount of compensation needed. This scale is preferably calibrated in terms of the depth of drilling which is needed, so that, once the contact 81 has been moved to a position which makes the speed of disc 52 the same as that of disc 56, the operator may simply remove the unit 51, place it in a drill press, and drill a hole 91 to the depth on the scale 86 indicated by the position of contact 81, the handle on the drill press of course being calibrated so that the depth of drilling may be determined as the drilling is performed.

The unit 51 may now be assembled into a complete meter. When it has been assembled, the meter will of course be given the usual adjustments including those for light load and 100% load. It will not be necessary to make any further adjustment or test for 300% load because the overload plate 21 has already been so adjusted or calibrated that with the unit 51 it gives the proper compensation for 300% load.

The scale 86 may be calibrated readily from test data. The chart shown in Fig. 10 may be helpful in calibrating such a scale, although of course the curve shown in this chart would be slightly different for any different design of meter or any different design of overload plate. In calibrating a scale such as the scale 86 or in preparing a chart such as that of Fig. 10, it is preferable to check the data by completion of the meter so that the average effect of adding the light load adjusting plate and any other changes involved in completing the meter will be automatically taken into consideration. Thus, assuming it were determined by test that approximately 1% added compensation were required, the overload plate would be drilled to a depth which preliminary data would indicate would give this compensation. The meter would then be completed and tested. If it were found that this depth had in fact given 1.1% compensation, the actual depth of drilling used would be plotted not against the 1% overload compensation which had been expected, but against the 1.1% which was actually provided. In this way the chart of Fig. 10 and likewise the scale 86 automatically eliminate any errors which would otherwise be present due to the differences between the testing of the unit 51 as shown in Fig. 9 and its actual installation in the final meter.

Figure 10:
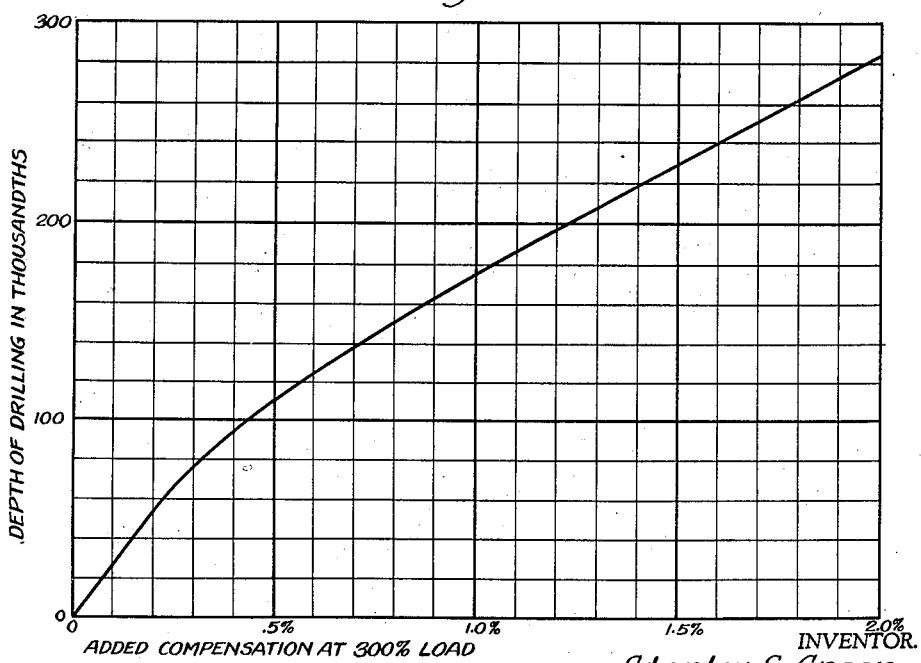
Fig. 10 is a graph showing for a particular design of meter and overload plate the amount of compensation which will be added for various depths of drilling.

The accuracy of the chart of Fig. 10 and likewise the accuracy of the calibration of scale 86 will depend somewhat on uniformity of metal used for the laminations of the overload plate. Accordingly, it may be helpful to give the preferred specifications for this metal, especially since these specifications may indicate the best metal for use in overload compensation plates. The lamination stock is formed from "Armco" magnet ingot iron, which is a commercially pure iron. The finished sheets should be cold rolled from mill stock, always with the same reductions. The illustrated form uses two thicknesses, the lamination stock of .015 inch thickness being rolled from .025 inch thickness, and that of .031 inch thickness being rolled from .050 inch thickness. The mill stock, prior to being thus cold rolled, should have had the standard mill treatment of hot rolling, annealing and pickling. In the cold rolling reduction the material should be passed through the rolls not less than five times.

After the laminations are punched from the stock, they are annealed with the greatest possible uniformity. They are cleaned and then stacked neatly and raised gradually to 1400° F. by pyrometer measurement in not less than one hour. They should be held for 1¾ hours and then allowed to cool gradually, as by being left in the annealing furnace overnight.

The transformer 85 preferably has a rather high ratio, say 20 to 1, so that the full range of movement of contact 81 will produce only a small change of voltage impressed on coil 11 thus providing a delicate adjustment of the voltage. This will have the incidental advantage that coil 84 will have very low reluctance so that it will not appreciably affect the voltage impressed on coil 11 directly from the line wires 57. However, any such effect of the coil 84 may be completely eliminated by adjusting the zero position of contact 81 so as to balance out such effect.

From the foregoing it is seen that a method is provided for calibrating overload compensators and the driving units on which they are to be used, and adjusting the compensators to give the necessary compensating effect with such ease and rapidity that the method may be performed for each individual meter and may be performed very easily for a series of meters each day or for each run from a given batch of lamination stock. Furthermore, an overload plate has been devised which lends itself particularly well to the adjustments, assuring that a given depth of drilling will always have the same effect. As a result of these improvements the accuracy of overload compensation need no longer depend on the frequency with which it is practical to make inconvenient and expensive tests and change the dies with which the laminations are stamped out.

I claim:

1. The method of adjusting an overload compensator to provide the compensation required by a given meter, which comprises the steps of applying the driving magnets of the meter together with the compensator to a test disc in a temporary manner, making like test connections for said magnets and for a standard meter, adjusting retarding means for the test disc to cause the test disc to rotate at the same speed as the disc of the standard meter, thereafter increasing the current going through the current coils of both the unit being tested and the standard meter to a substantially higher value, thereafter measuring the amount of compensation needed to again bring the test disc to the same speed as the disc of the standard meter, and thereafter drilling the compensator to a depth which will give this compensation, all before assembly of the driving magnets into a permanent meter.

2. The method of adjusting an overload compensator to provide the compensation required by a given meter, which comprises the steps of applying the driving magnets of the meter, before making any adjustments therefor, together with the compensator to a test disc in a temporary manner, making like test connections for said magnets and for a standard meter, adjusting retarding means for the test disc to cause the test disc to rotate at the same speed as the disc of the standard meter, thereafter increasing the current going through the current coils of both the unit being tested and the standard meter to a substantially higher value, thereafter measuring the amount of compensation needed to again bring the test disc to the same speed as the disc of the standard meter, and thereafter drilling the compensator to a depth which will give this compensation, all before assembly of the driving magnets into a permanent meter and the adjustment thereof.

3. Apparatus for calibrating compensator plates and meter magnet units having current and voltage coils and with which they are to be associated to determine the amount of additional compensation necessary, including a standard meter having a disc and voltage and current coils, a permanently mounted test disc associated therewith in a manner to facilitate comparison of its speed with the speed of the disc of the standard meter and adapted to have a unit to be tested applied thereto temporarily, means for retarding said test disc including an electromagnet and a rheostat associated therewith for the quick adjustment of the retardation of said test disc, means for applying a voltage to the two voltage coils, means for supplying a current to the two current coils during the adjustment of the retardation of the test disc, means for substantially increasing the current through the current coils, and adjustable electrical means independent of the initial adjustment of the damping means to cause the test disc to rotate at the same speed as the disc of the standard meter, said adjustable electrical means being calibrated to indicate the additional compensation required.

4. Apparatus for calibrating compensator plates and meter magnet units having current and voltage coils and with which they are to be associated to determine the amount of additional compensation necessary, including a standard meter having a disc and voltage and current coils, a permanently mounted test disc associated therewith in a manner to facilitate comparison of its speed with the speed of the disc of the standard meter and adapted to have a unit to be tested applied thereto temporarily, means for retarding said test disc including an electromagnet and a rheostat associated therewith for the quick adjustment of the retardation of said test disc, means for applying a voltage to the two voltage coils, means for supplying a current to the two current coils during the adjustment of the retardation of the test disc, means for substantially increasing the current through the current coils, and adjustable means independent of the initial adjustment of the damping means to cause the test disc to rotate at the same speed as the disc of the standard meter.

5. Apparatus for calibrating compensator plates and meter magnet units having current and voltage coils and with which they are to be associated to determine the amount of additional compensation necessary, including a standard meter having a disc and voltage and current coils, a permanently mounted test disc associated therewith in a manner to facilitate comparison of its speed with the speed of the disc of the standard meter and adapted to have a unit to be tested applied thereto temporarily, means for retarding said test disc including an electromagnet and a rheostat associated therewith for the quick adjustment of the retardation of said test disc, means for applying a voltage to the two voltage coils, means for supplying a current to the two current coils during the adjustment of the retardation of the test disc, means for substantially increasing the current through the current coils, and adjustable electrical means including an adjustable transformer inductively coupled to the circuit of one of the meter coils whereby the voltage impressed on said coil may be altered to bring the speeds of the two discs together, said adjustable electrical means being calibrated to indicate the additional compensation required.

6. The method of determining additional compensation desired from a given overload compensator, which includes the steps of applying the compensator to a test assembly to form a meter therewith, and comparing this meter with a standard meter at two substantially different loads before making any permanent adjustments which would be affected by a change in the overload compensator.

7. An overload compensator for watt-hour meters adapted to extend between the two poles of a meter magnet with its face positioned adjacent to one face of a meter disc running adjacent said poles, including a magnetic lamination extending along the face of the compensator, a second magnetic lamination more remote from said face, and an intermediate magnetic lamination spacing said two laminations apart and itself cut away a substantial distance from an edge along a line suitable for drilling the second lamination in a direction parallel to said face to change the compensating characteristics of the compensator.

8. An overload compensating plate for watt-hour meters, including terminal magnetic portions adapted to lie adjacent two poles of a watt-hour meter, and magnetic portions forming connecting paths between the terminal portions, one of said paths being a short path and another being an elongated path separated from the short path by at least one slot, the elongated path being tortuous between the remote slot ends with magnetic metal on one side only of the shortest line through said path, at two spaced points along said path, and on the other side of said line at an intermediate point, and a notch approaching said line on the first side between said spaced points.

STANLEY S. GREEN.